Patented Dec. 17, 1929

1,740,276

UNITED STATES PATENT OFFICE

ALBERT G. STILLWELL, OF COSCOB, CONNECTICUT

PROCESS OF TREATING WASTE MATERIAL

No Drawing.     Application filed February 21, 1929. Serial No. 341,839.

This invention relates to the treatment of organic substances, and more particularly to the treatment of waste products derived from sugar refineries whereby said products are dried and are rendered permanently non-hygroscopic and in a form suitable for fertilizers and other analogous arts.

It is desirable to treat the waste liquors from distilleries or sugar refineries for producing substances which are useful in the arts and to recover the various valuable constituents thereof. These liquors are of a complicated composition and contain many organic acids such as malonic, oxy-citric, malic, succinic, tartaric. They may also contain organic nitrogenous compounds or proteids in the form of xanthine bodies, betaine etc, as well as a considerable amount of glycerine. In order to render these waste liquors suitable for fertilizers it is necessary that they be formed into a dry product and that the nitrogenous compounds should not be decomposed or their structure impaired. It is also necessary to prevent the dry powder from again absorbing moisture from the air whereby certain of its desirable properties will be lost.

It has been found that the hygroscopic properties of the dry product are derived from certain constituents which are capable of absorbing moisture from the air provided they are not eliminated during the drying process. In accordance with the present invention these substances are eliminated by the application of a suitable degree of heat to form a powder which is permanently non-hygroscopic. In applying the necessary heat, however, it is essential to maintain the temperature below that at which the organic nitrogenous compounds will be broken up and at which the organic substance will be damaged.

One of the principal ingredients of the waste liquor which contributes to the hygroscopic properties thereof is glycerine. It is essential, therefore, to drive off this constituent in order to cause the substance to permanently remain in a dry condition. In accordance with the present invention it has been found that this substance may be removed at a temperature considerably below its boiling point provided a certain amount of water is present. This feature is made use of in arriving at a suitable temperature at which the substance may be dried and in providing for the drying operation at a temperature sufficiently low to prevent the harmful effects above mentioned.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the following description and in the claims the various steps in the process and the details comprising the invention will be identified by specific names, for convenience; but they are intended to be as generic in their application as the art will permit.

The invention comprises, in general, heating the waste liquor derived from distilleries or sugar refineries at a temperature which is sufficiently high to drive off the hygroscopic constituents and form the substance into a dry product, and which at the same time is not sufficiently high to injure the proteids and other organic substances. It has been found that a temperature ranging between 150° C. and 250° C. is suitable for this purpose. Various organic acids are removed at a comparatively low temperature and, in the presence of water, glycerine may be substantially entirely removed at a temperature of substantially 160° C. Charring or breaking up of the nitrogenous compounds does not take place at a temperature below 250° C. There is accordingly a comparatively wide latitude of temperatures which may be employed for producing the desired results. It is obvious that the substance could be dehydrated and formed into a dry product at temperatures considerably below 150° C. In that case, however, the hygroscopic constituents would not be removed and the substance would again absorb moisture from the air and be rendered unsuitable for commercial uses.

As a specific example of a manner in which this invention may be carried on, waste products from a sugar refinery were evaporated to 30° Baumé, forming a mixture consisting of approximately 50% water and 50% solid matter. This mixture was then heated to a temperature approximating 170° C. At that temperature the hygroscopic constituents comprising malonic acid, oxy-citric acid, malic acid, succinic acid, tartaric acid and other organic acids as well as glycerine were disintegrated or distilled off. Precautions were taken to avoid the temperature exceeding 250° C. in order to avoid disintegrating the nitrogen compounds or charring the organic matter. This heat treatment of the mixture was continued until the product had become totally dehydrated. In this way a dry non-hygroscopic product was obtained in an efficient and inexpensive manner without the application of additional reagents.

Any suitable method of heating may be employed provided the temperature of all parts of the mixture is accurately controlled. A considerable quantity of heat may be applied at the beginning of the process when a considerable quantity of water is present but as the water is driven off this must be regulated accordingly.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The method of treating organic waste products containing hygroscopic constituents and organic nitrogenous constituents which comprises heating said products to a sufficiently high temperature to eliminate moisture, and to substantially eliminate the hygroscopic constituents while maintaining said temperature sufficiently low to prevent disintegration of the nitrogenous compounds.

2. The method of treating an organic substance containing organic acids of the group comprising succinic, tartaric, malonic, oxy-citric, and malic acid and nitrogenous organic compounds of the group comprising xanthine, and betaine bodies which comprises heating said mixture to a sufficiently high temperature to eliminate said organic acids, said temperature being sufficiently low to prevent injury to said nitrogenous organic compounds.

3. The method of treating organic waste products containing glycerine and organic nitrogenous constituents which comprises heating said product to a sufficiently high temperature to eliminate moisture, and to substantially eliminate said glycerine while maintaining said temperature sufficiently low to prevent disintegration of or injury to the nitrogenous compounds.

4. The method of treating an organic substance containing organic acids, glycerine and nitrogenous organic compounds which comprises heating said mixture to a sufficiently high temperature to drive off said organic acids and glycerine, said temperature being sufficiently low to prevent elimination of or injury to said nitrogenous organic compounds.

5. The method of treating organic waste products containing moisture and glycerine which comprises heating said product to a sufficiently high temperature to eliminate moisture, and to substantially eliminate said glycerine whereby a substantially dry, non-hygroscopic mass is produced said temperature being below the boiling point of glycerine.

6. The method of treating an organic substance containing organic acids, glycerine and nitrogenous organic compounds which comprises heating said mixture to a temperature between 150° C. and 250° C. whereby said glycerine is driven off and injury to said nitrogenous organic compounds is avoided.

7. The method of treating organic waste products containing hygroscopic constituents glycerine and organic nitrogenous compounds which comprises heating said product to a temperature of substantially 170° C. whereby moisture, glycerine and substantially all of said hygroscopic constituents are eliminated and a dry non-hygroscopic mass is produced.

In testimony whereof I have hereunto set my hand and seal.

ALBERT G. STILLWELL.